United States Patent [19]
Becker-Irvin

[11] Patent Number: 5,869,948
[45] Date of Patent: Feb. 9, 1999

[54] UNIDIRECTIONAL BATTERY CHARGE/ DISCHARGE CONTROLLER FOR A REGULATED ELECTRICAL BUS SYSTEM WITH A SOLAR CURRENT SOURCE

[75] Inventor: Craig H. Becker-Irvin, Redondo Beach, Calif.

[73] Assignee: Hughes Electronics Corporation, Los Angeles

[21] Appl. No.: 851,359

[22] Filed: May 5, 1997

[51] Int. Cl.$^6$ ............................... H02J 7/12; G05F 1/40
[52] U.S. Cl. ........................ 320/101; 320/128; 323/274
[58] Field of Search .................... 320/101, 128, 320/164, 138, DIG. 11; 323/906, 274, 275; 307/43–87

[56] References Cited

U.S. PATENT DOCUMENTS

| | | | |
|---|---|---|---|
| 5,025,202 | 6/1991 | Ishii et al. ............................ | 320/101 |
| 5,270,636 | 12/1993 | Lafferty ................................ | 320/101 |
| 5,394,075 | 2/1995 | Ahrens et al. ....................... | 320/101 |
| 5,530,335 | 6/1996 | Decker et al. ....................... | 320/102 |
| 5,648,731 | 7/1997 | Decker et al. ....................... | 324/767 |
| 5,659,465 | 8/1997 | Flack et al. .......................... | 363/71 |

*Primary Examiner*—Peter S. Wong
*Assistant Examiner*—Gregory J. Toatley, Jr.
*Attorney, Agent, or Firm*—Terje Gudmestad; Georgann S. Grunebach; Michael W. Sales

[57] ABSTRACT

In a satellite experiencing alternate periods of light and eclipse, an electrical power control system utilizing direct energy transfer battery charging in a fully regulated electrical bus system to provide and control the system power over both the charging and the discharging cycles of the satellite electrical system.

11 Claims, 2 Drawing Sheets

UNIDIRECTIONAL BATTERY CHARGE/ DISCHARGE CONTROLLER FOR A REGULATED ELECTRICAL BUS SYSTEM WITH A SOLAR CURRENT SOURCE

TECHNICAL FIELD

The present invention relates to electrical power subsystems such as used in earth orbiting satellites, and more specifically to such a system utilizing direct energy transfer battery charging in a fully regulated electrical bus system to provide and control system power over both the charging and the discharging cycles of the satellite electrical system.

BACKGROUND ART

The unique feature of the majority of satellite power system design is the requirement to provide continuous power to the satellite payloads and service subsystems in an environment where the power source (usually a solar array) is routinely interrupted by the eclipse of the source, resulting from the passage of the satellite through the earth's shadow.

In order to provide power to the satellite's electrical system during periods of eclipse, energy storage systems must be incorporated in the satellite electrical bus system. The battery is the storage device generally used. This requires providing a means of charging the battery during the time the satellite is in the sunlight and regulating the discharge of the battery during the eclipses.

Further, during the periods of charge and discharge, the bus must be regulated to provide the proper voltage required by the satellite electronics.

In such battery powered systems, electrical power bus regulation therefore becomes a major concern. The bus is required to supply a system with operating power at all times. Such systems usually incorporate two power sources, a primary source such as a solar array which converts sunlight into electrical energy, and a storage system such as a battery which can supply power when the external source does not supply sufficient power to meet system requirements.

In such prior art systems, the satellite electrical power system (EPS) employs a fully regulated bus, receiving power from the solar panels and regulating the voltage on the bus. Such EPS systems rely on an electronic battery charge controller which uses a constant voltage source, i.e. the regulated satellite bus, as an input and provides a constant current output for charging the batteries. Such systems, during eclipse, sense the loss of the constant voltage from the solar panels and begin to discharge the batteries via a discharge controller to change the battery discharge current into a voltage on the satellite bus to maintain system voltage on the bus at the required levels.

As a result, the satellite is required to carry separate battery charge and discharge controller units to provide for each bus power control function. Since the satellite is in sunlight for the greater part of its operational life, the discharge control unit adds unnecessary weight as well as cost to the satellite.

Additionally, the use of the satellite bus power to charge the battery is inefficient. Power is lost in the conversion from solar power to the satellite bus and, again, from the bus to battery charge power.

SUMMARY OF THE INVENTION

Electrical power subsystems (EPS) which employ a fully regulated electrical bus system usually rely on electronic battery charge control which uses a constant voltage source (the satellite electrical bus) as an input and provides a regulated constant current output for charging.

The present invention provides a method and apparatus for satellite power control in which direct energy transfer charging (DETC), a battery charging method commonly used in unregulated and sunlight regulated electrical bus systems, is combined with battery discharge electronics to provide system power control for a fully regulated electrical bus system.

In accordance with the present invention, a satellite power system is provided with a bus solar array for providing power to a voltage regulated power bus and a charge solar array for providing charge current to a storage device such as a battery. The bus solar array and bus voltage limiter (BVL) provide a constant voltage to the regulated system bus.

The charge solar array is connected directly to the battery positive contact preferably through a blocking diode and provides essentially constant current as an output. An electronic discharge controller is connected between the battery positive contact and the bus. Utilizing a current sensor, the discharge controller regulates the current into the battery.

When the battery is fully charged, the discharge controller converts the excess charge array current to the satellite bus, increasing the voltage thereon. The BVL senses the increase in voltage and reduces its output from the bus solar array to maintain bus voltage regulation. During eclipse operation, the discharge controller operates to provide battery power to maintain proper satellite bus voltage regulation.

Accordingly, it is an object of the present invention to provide a common unidirectional power control system which controls both the charging of the storage system and operational system power during full operation of the primary power source and the discharging of the storage system to augment the operational power during less than optimum operation of the primary source.

It is another object of the present invention to reduce the weight which must have carried on a satellite. It is still a further object of the present invention to reduce the cost of satellite power systems.

BRIEF DESCRIPTION OF THE DRAWINGS

These and further features, aspects, and advantages of the present invention will become better understood with reference to the following descriptions, appended claims, and accompanying drawings where:

BEST MODES FOR CARRYING OUT THE INVENTION

Figure 1:
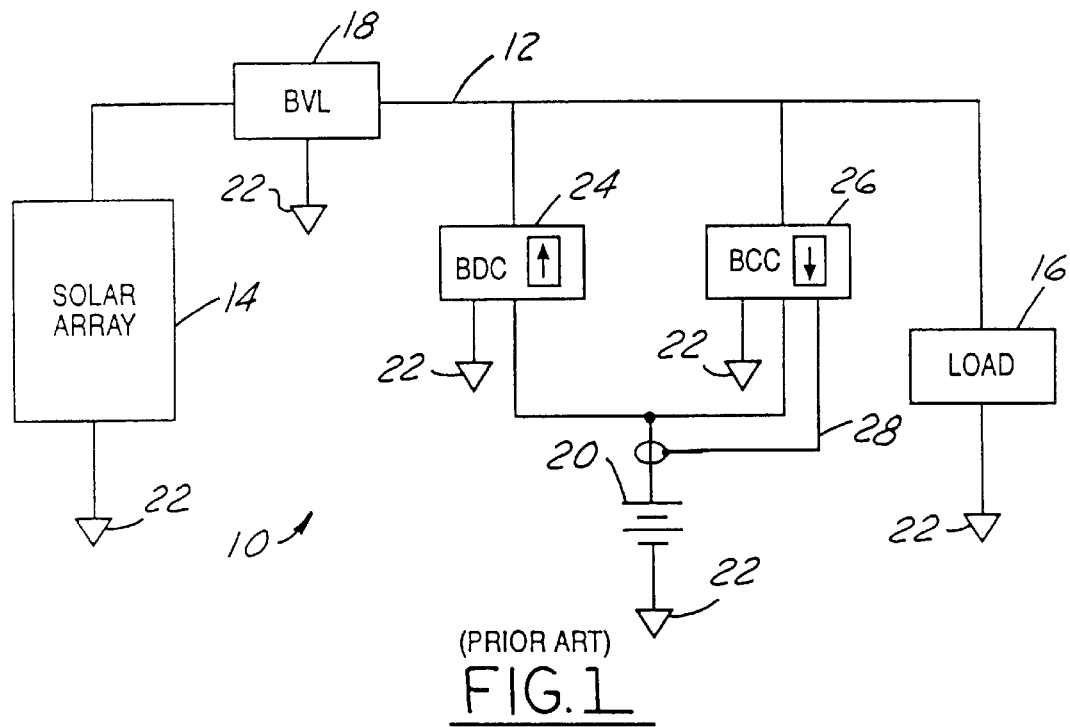
FIG. 1 is a block diagram of a regulated satellite power bus used in the prior art.

A typical regulated power bus system 10, and referring now to FIG. 1, such as used in a space satellite and as disclosed in the prior art is shown. Bus system 10 includes a regulated bus 12 coupled between a primary power source such as a solar array 14 and the satellite electrical load 16.

A bus voltage limiter (BVL) 18 is coupled on the regulated bus 12 between the solar array 14 and the satellite load 16 for purposes as will be hereinafter described. A secondary power source, such as an electrical storage battery 20, is coupled between system ground 22 and a battery discharge controller (BDC) 24 and a battery charge control (BCC) 26.

Both battery discharge controller 24 and battery charge controller 26 are coupled to regulated bus 12 at a point common to the bus voltage limiter 18 and the satellite load 1G. Additionally, a feedback current sensor 28 is coupled between battery 20 and battery charge control 26.

Figure 2:
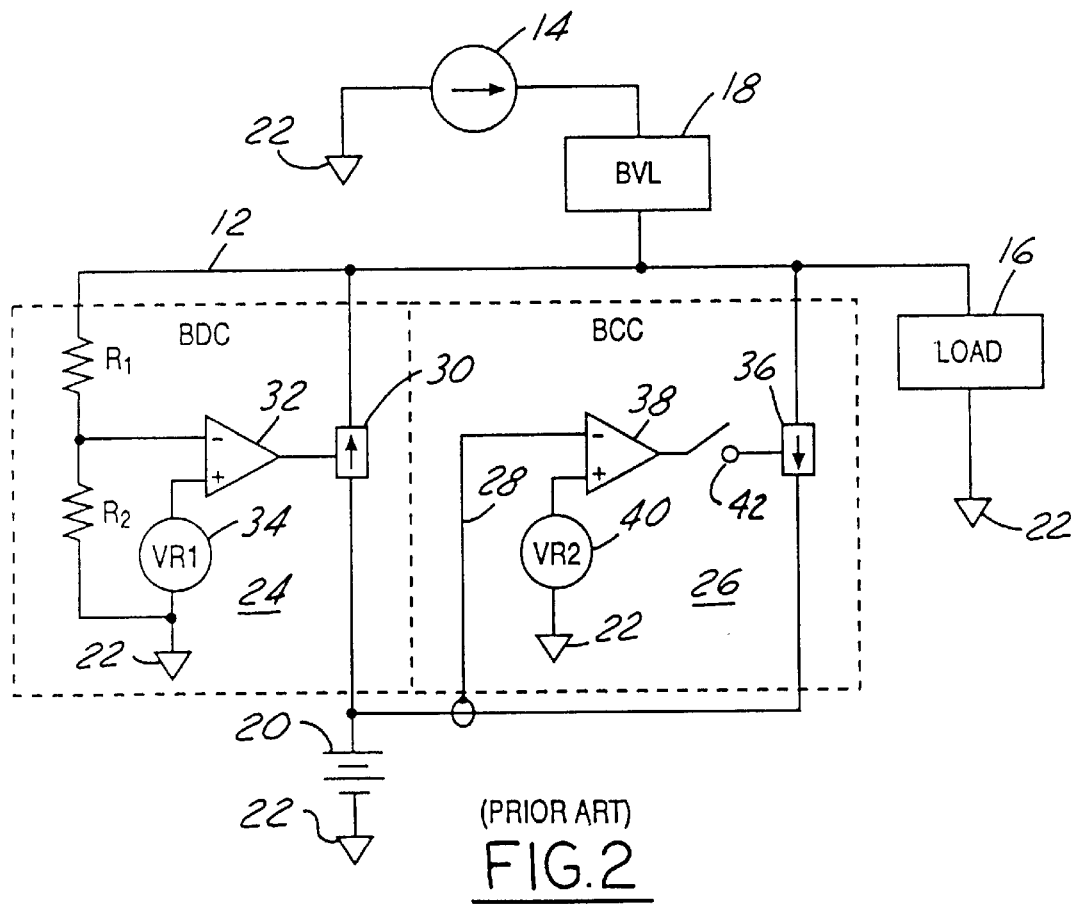
FIG. 2 is a block diagram of a battery charge/discharge control system found in the prior art.

Referring now to FIG. 2, the battery charge and discharge controls 26 and 24, respectively, of the prior art are shown in greater detail. Battery discharge controller (BDC) 24 includes a discharge power stage 30 coupled between the storage battery 20 and the regulated bus 12. A first error amplifier 32 is resistively coupled, $R_1$ $R_2$, in a voltage feedback configuration between regulated bus 12 and a first reference voltage source 34 for control of the discharge power stage 30 as will be hereinafter explained.

Battery charge controller (BCC) 26 includes a charge power stage 36 coupled between battery 20 and regulated bus 12. A second error amplifier 38, having inputs coupled to current feedback path 28 and a second reference voltage source 40, has an output coupled through a charge inhibit control circuit 42 to charge power stage 36.

Referring again to FIG. 1, the bus system 10 of the prior art receives electrical power through the action of sunlight on solar array 14. The power is converted to bus voltage wherein voltage limiter 18 acts to regulate the voltage across regulated bus 12 at a slightly higher voltage level than when the solar array 14 is in less than full light, i.e., semi- or actual eclipse, so as to prevent discharge of the battery 20 during normal sunlight operation.

Further, and again referring to FIG. 2, the battery discharge controller 24 and the battery charge controller 26 required by the prior art are shown. When sufficient power from an external source such as the solar array 14 is available on regulated bus 12, the bus voltage limiter 18 regulates the voltage on regulated bus 12 and battery charge controller 26 converts bus voltage to a current which is supplied as charge current, via charge power stage 36 to battery 20. Charge current regulation is accomplished by a control signal coupled into charge power stage 36. The control signal is developed in second error amplifier 38 by summing a predetermined voltage coupled into second error amplifier 38 from second reference voltage source 40 with a signal developed using current sensor 28 coupled to the charging current input to battery 20. The signal coupled into power stage 36 acts as a control to charge the battery 20 at a predetermined rate.

When the output power from solar array 14 is not sufficient to permit bus voltage limiter 18 to regulate the voltage across regulated bus 12, battery discharge controller 24 activates to regulate the bus 12 voltage by using battery 20 as a power source. In this condition, bus regulation is accomplished using discharge power stage 30 to convert battery 20 current into voltage across regulated bus 12. Discharge power stage 30 is controlled by a signal coupled from first error amplifier 32. This control signal is developed from inputs into first error amplifier 32 comprising a voltage feedback signal and the output of first reference voltage source 34.

During operation, and in order to prevent simultaneous charge and discharge operation of the system, a charge inhibit control circuit 42 is provided between the second error amplifier 38 and the charge power stage 36. Charge inhibit control circuit 42 is energized during the discharge cycle of operation of the system.

Thus, the prior art system requires two separate power stages, one to transmit power from the regulated bus 12 to the battery 20, and one to transfer energy from battery 20 to regulated bus 12, even though both functions may be housed in a single unit.

Figure 3:
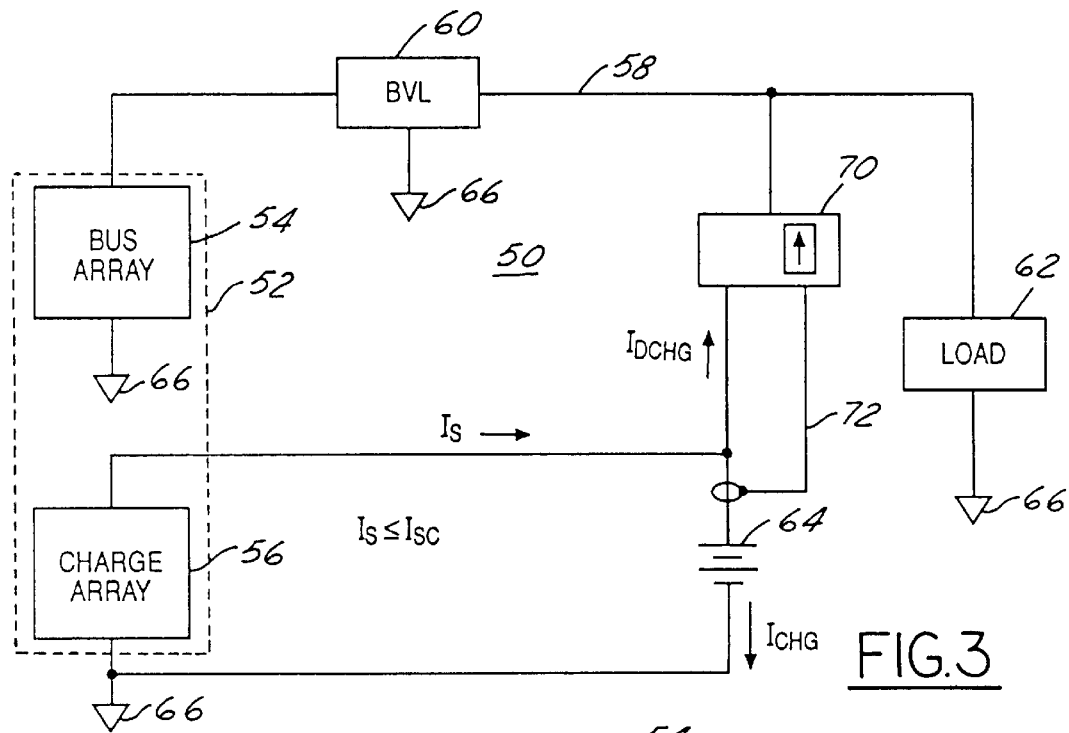
FIG. 3 is a block diagram of regulated satellite power bus using the present invention.

Referring now to FIG. 3, a spacecraft bus system 50 incorporating the present invention is shown. In the present invention, solar array 52 is partitioned into a bus array 54 and a charge array 56. Bus system 50 includes a regulated bus 58 coupled to the bus voltage limiter 60 and a satellite load 62.

The bus voltage limiter 60 is coupled between the regulated bus 58 and the bus array 54. A storage battery 64 and charge array 56 are connected in parallel and coupled between system ground 66, through a unidirectional battery charge/discharge controller 70, and into regulated bus 58 common with the bus voltage limiter 60 and the satellite load 62. A current feedback path 72 is provided between battery 64 and charge/discharge controller 70.

Figure 4:
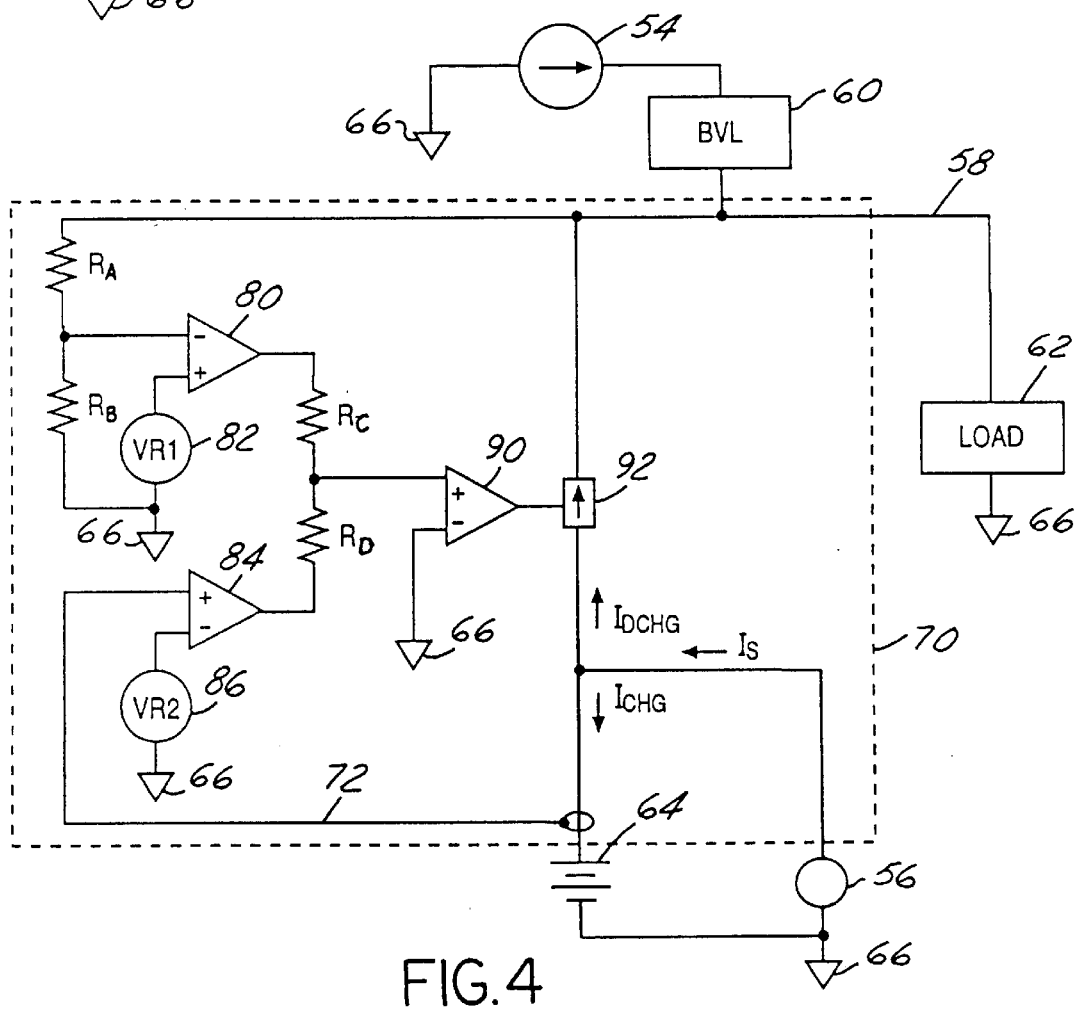
FIG. 4 is a block diagram of the charge/discharge control system of the present invention.

Now referring to FIG. 4, the unidirectional battery charge/discharge controller 70 of the present invention is shown in greater detail. The controller 70 includes a first error amplifier 80 having an input voltage resistively coupled, $R_A$, $R_B$, into it from regulated bus 58 and a reference voltage directly coupled into it from a first reference voltage source 82. The charge/discharge controller 70 further includes a second error amplifier 84 having inputs from current feedback path 72 and from second reference voltage source 86. The outputs from first error amplifier 80 and second error amplifier 84 are resistively coupled $R_C$,$R_D$ into one input of a summing amplifier 90 with a second input of summing amplifier 90 connected to system ground 66. The output of summing amplifier 90 is coupled into a power stage 92.

Still referring to FIGS. 3 and 4, the present invention permits use of the charge/discharge controller 70 to regulate system power. During sunlight, bus array 54 provides power to regulated bus 58 with bus voltage limiter 60 regulating the voltage to a slightly higher level than during an eclipse on the bus array 54. This is to guarantee that the battery charging function of the charge/discharge controller 70 will override the discharge function of the controller 70.

The charge array 56 provides current ($I_S$) with:

$$I_S \leq I_{SC} \qquad (1)$$

where $I_{SC}$ is the short circuit current of the charge array 56.

Thus, when sufficient power is available from both arrays, bus array 54 regulates the bus 58 voltage and the charge array 56 provides charge current, $I_{CHG}$, directly to the battery 64. Battery 64 charge current $I_{CHG}$ is regulated by using battery charge current feedback wherein $I_{CHG}$ is sampled and the sampled current is input via current feedback path 72 into second error amplifier 84, compared with second reference voltage source 86 to produce a voltage signal indicative of $I_{CHG}$, which is combined with a signal indicative of the regulated bus 58 voltage from first error amplifier 80, the combined signals input into summing amplifier 90 which produces an output signal which is coupled into power stage 92. Power stage 92 regulates the charging current $I_{CHG}$ to battery 64 by discharging sufficient current, $I_{DCHG}$ from $I_S$ to maintain $I_{CHG}$ at the proper level, where:

$$I_{CHG} = I_S - I_{DCHG} \qquad (2)$$

with the excess current, $I_{DCHG}$, coupled into regulated bus 58 and converted to bus power.

Conversely, during eclipse when bus array 54 power is insufficient to regulate regulated bus 58 or when the satellite load 62 demand exceeds the combined array power output, the signal produced through the regulated bus voltage feedback resistive network $R_A, R_B$ and coupled into first error amplifier 80 with first reference voltage source 82 produces a signal output indicative of the inability of bus array 54 to provide sufficient power to the system bus 58. This signal is combined with the charge current error signal developed in second error amplifier 84 across a resistive network $R_C, R_D$, where $R_C$ and $R_D$ are selected such that the bus 58 voltage control loop dominates when the bus 58 voltage is less than the voltage required to regulate bus 58. The combined signal developed across $R_C, R_D$ is coupled into summing amplifier 90 to develop a control signal output to power stage 92 which initiates use of battery 64 and charge array 56 to supply power to the system until such time as bus array power is sufficient to regain control of bus regulation.

While the form of the invention herein disclosed is a preferred embodiment, many others are possible. It is not intended to mention all of the equivalent forms or ramifications of this invention. It is understood that the terms used herein are merely descriptive rather than limiting, and that various changes may be made without departing from the spirit or scope of the invention.

What is claimed is:

1. An electrical power subsystem for use with a fully regulated electrical bus system having a voltage bus for providing operating power to a load connected to the bus, comprising:

a bus voltage limiter coupled to the regulated bus, the bus voltage limiter operative to maintain bus power at a predetermined level;

an energy storage device;

an at least two section solar array having a first section and a second section, said first section being a current source coupled in parallel with the energy storage device, the current source providing a charging current to the storage device for charging same, said second section coupled through said bus voltage limiter to the regulated electrical bus supplying power to a system load; and a unidirectional charge/discharge controller having a power stage, said power stage coupled between the first section and energy storage device and said voltage bus, the charge/discharge controller operative to regulate the amount of charging current provided to the energy storage device to provide an optimum current charge in the energy storage device, a power stage responsive to the charge current coupled to the battery and operative to maintain the battery charge at a predetermined level by coupling excess charge current to the regulated voltage bus.

2. The subsystem of claim 1, further including a sensor coupled between the energy storage device and the charge/discharge controller, the sensor operative to determine the amount of charging current required to maintain the optimum charging current in the energy storage device.

3. The subsystem of claim 2 wherein the sensor generated current signal is coupled into the charge/discharge controller, the charge/discharge controller responsive thereto to regulate the amount of charging current coupled into the energy storage device.

4. subsystem of claim 2, wherein the energy storage device is a battery.

5. The subsystem of claim 1, wherein the battery charge/discharge controller is unidirectional and includes:

a first error amplifier resistively coupled to the regulated voltage bus, for receiving a signal indicative of the voltage on the regulated bus, and also coupled to a first reference voltage source to develop a first error signal at a first signal output indicative of the regulated voltage;

a second error amplifier coupled to the current sensor, for receiving the generated current signal, and also coupled to a second reference voltage source to develop a second error signal at a first signal output indicative of the charging current; and the first and second signal outputs resistively coupled into a summing amplifier to combine the signals and provide a control signal output for controlling the charging current to the battery.

6. The subsystem of claim 5, further including:

a power stage coupled to receive the battery charge current control signal and operative to couple a part of the charging current to the regulated bus to maintain optimum charge on the battery, the bus voltage limiter operative to compensate for diverting charging current to the regulated bus by reducing the power coupled from the second section of the solar array; and the power stage further responsive to the control signal to detect reduction of voltage on the regulated bus and to initiate battery discharge to maintain the bus voltage at the predetermined level.

7. The method of controlling an electrical power subsystem for use with a fully regulated electrical bus system, comprising the steps of:

providing an electrical storage battery;

charging the battery by directly coupling the output from a first current source into the battery;

monitoring the charge status of the battery and regulating the charging current to maintain the battery charge at optimum by diverting part of the charging current away from the battery.

8. The method of claim 7, wherein the step of monitoring includes:

sensing the charge on the battery and developing a signal indicative of the charge status thereof;

coupling the charge status signal into a charge/discharge controller; and discharging a part of the charging current to reduce the charging of the battery.

9. The method of claim 8, further including the steps of:

providing a second current source and coupling the output therefrom to a regulated voltage bus providing load power to the regulated electrical bus system.

10. The method of claim 9, including the step of diverting a portion of the storage device charging current to the regulated voltage bus to maintain the desired charging current on the device.

11. The method of claim 10, further including the steps of:

monitoring the charge current on the regulated voltage bus and discharging a portion of the current coupled thereto from the second current source for maintaining optimum current charge on the regulated voltage bus and optimum current charge to charge the storage device.

* * * * *